(12) United States Patent
Dennis et al.

(10) Patent No.: US 9,592,801 B2
(45) Date of Patent: Mar. 14, 2017

(54) PARKING BRAKE SYSTEM USING A PROGRAMMABLE LOGIC CONTROLLER AND HAVING A TOWING MODE

(71) Applicant: Ausco Products, Inc., Benton Harbor, MI (US)

(72) Inventors: Brian P. Dennis, Kalamazoo, MI (US); Edward L. Chandler, St. Joseph, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 0 days.

(21) Appl. No.: 14/929,633

(22) Filed: Nov. 2, 2015

(65) Prior Publication Data

US 2016/0144839 A1    May 26, 2016

Related U.S. Application Data

(60) Provisional application No. 62/082,158, filed on Nov. 20, 2014.

(51) Int. Cl.
| | |
|---|---|
| *B60T 8/17* | (2006.01) |
| *B60T 13/22* | (2006.01) |
| *B60T 13/66* | (2006.01) |
| *B60T 13/74* | (2006.01) |
| *B60T 17/18* | (2006.01) |

(52) U.S. Cl.
CPC ............ *B60T 8/1708* (2013.01); *B60T 13/22* (2013.01); *B60T 13/662* (2013.01); *B60T 13/743* (2013.01); *B60T 17/18* (2013.01)

(58) Field of Classification Search
CPC ...... B60T 8/1708; B60T 13/22; B60T 13/662; B60T 13/743; B60T 17/18
See application file for complete search history.

(56) References Cited

U.S. PATENT DOCUMENTS

| | | | |
|---|---|---|---|
| 3,985,210 A | 10/1976 | Hodge et al. | |
| 6,037,673 A * | 3/2000 | Buhler | B60Q 1/44 307/10.8 |
| 2008/0191546 A1 | 8/2008 | Plantamura et al. | |

FOREIGN PATENT DOCUMENTS

EP      1 321 340 A1    6/2003

* cited by examiner

*Primary Examiner* — Michael D Lang
(74) *Attorney, Agent, or Firm* — Renner, Kenner, Greive, Bobak, Taylor & Weber

(57) ABSTRACT

A parking brake system includes an engine oil pressure switch normally controlling the activation of a parking brake. The controller is actuated to temporally ignore a communication from the engine oil pressure switch so that the brake may be released even when the engine is disabled.

16 Claims, 1 Drawing Sheet

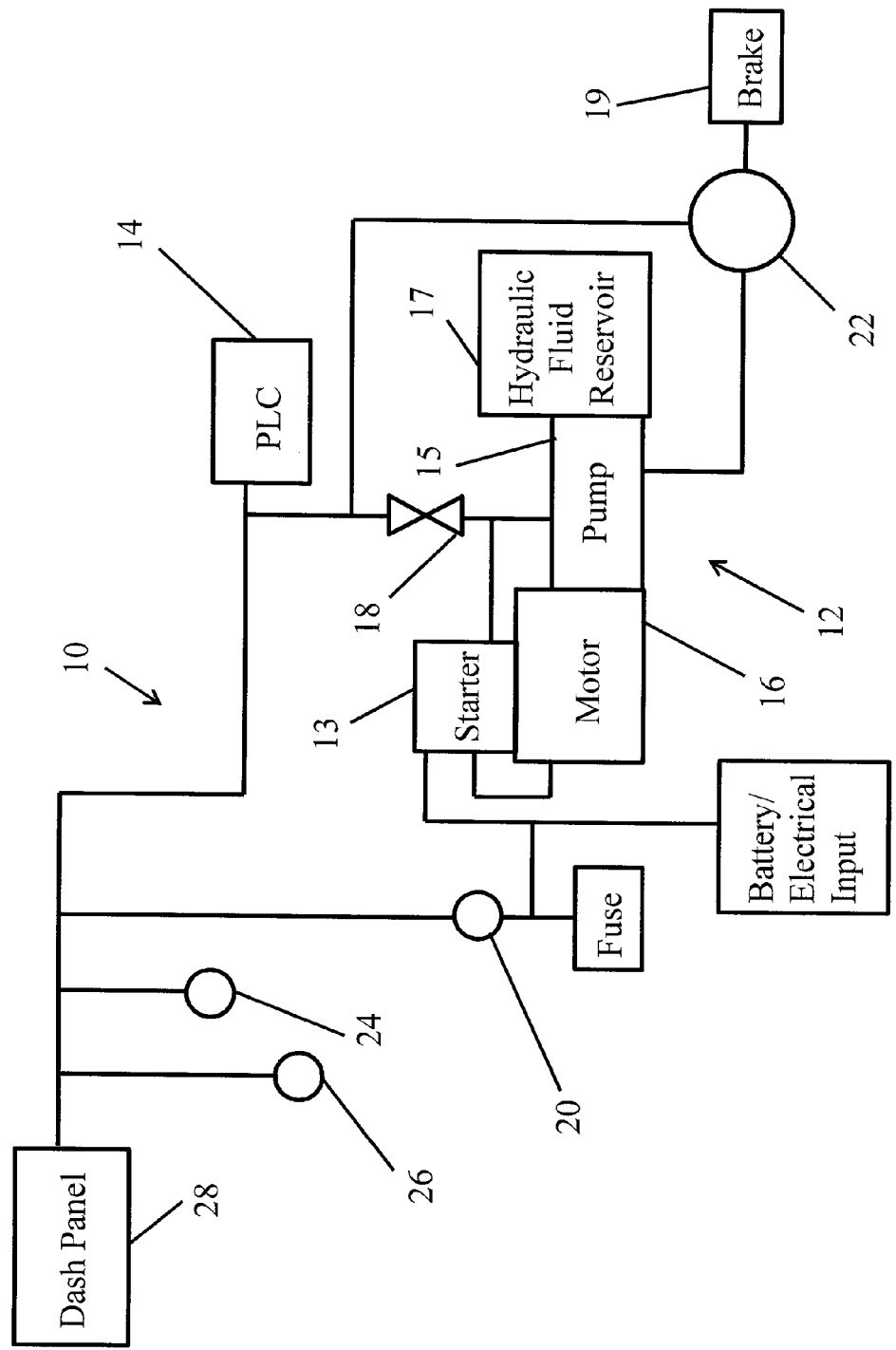

PARKING BRAKE SYSTEM USING A PROGRAMMABLE LOGIC CONTROLLER AND HAVING A TOWING MODE

CROSS-REFERENCE TO RELATED APPLICATIONS

The present application claims priority to U.S. Provisional Patent Application No. 62/082,158, filed Nov. 20, 2014, incorporated herein by reference.

TECHNICAL FIELD

The present invention relates to a brake system having an improved mechanism for releasing the brake. More particularly, the present invention relates to a parking brake system having a programmable logic controller with a towing mode programmed therein. More particularly, the present invention relates to a parking brake system for use with spring applied-hydraulically released brake that uses a programmable logic controller to release the brake even when the engine is disabled.

BACKGROUND OF THE INVENTION

Vehicles such as mining vehicles typically require spring-applied, hydraulically-released parking brakes. Springs are used to clamp the brake linings together and when hydraulic pressure is applied, one or more springs are compressed and the brake is released. Conversely, when hydraulic pressure is released, the one or more springs are decompressed or expanded, and the brake is engaged.

The source of the hydraulic pressure for releasing and engaging a brake is generally from the hydraulics of the vehicle since most mining vehicles include hydraulic systems. However, on small vehicles like the Toyota® Land Cruiser®, there is no vehicle hydraulic system. In these cases, a pump pack including an electric motor, a hydraulic pump, a hydraulic reservoir, and a solenoid valve is used.

The electric motor turns a hydraulic pump, which is used to create pressure to release the brakes. The solenoid valve is used to hold the pressure in the line keeping the brake released, so that the pump does not have to run continuously. The solenoid is a normally open device. This means that in absence of electrical power, the solenoid will open the brake line to tank, which will cause the pressure to fall to zero.

Thus, to engage the brakes, power to the solenoid and motor is turned off, pressure then falls, and the brakes engage. To release the brakes, power to the solenoid and motor is applied, which closes the solenoid, turns on the motor, and allows brake line pressure to build, so that the brakes release. Prior art pump packs use electrical relays and a pressure switch, which are mechanical switches, to signal the motor to start and stop, depending upon pressure. These pump packs also use relays to control power to the solenoid.

As it is critical that the brakes of these vehicles are engaged under certain conditions, these prior art pump packs generally include three independent conditions that will engage the brakes.

First, an engine oil pressure switch is used to signal relays on the pump kit to interrupt power to the solenoid and motor, which drops pressure and engages the brakes. If the engine is shut off, the brakes come on. Second, door switches are generally wired to the pump kit, so that if the door is opened, associated relays trip, and the brakes engage. Third, these pump packs generally include an emergency stop button on the dash panel that the operator can press to trip associated relays and cause the brakes to engage. By pulling the button, or by twisting the button in certain styles, an operator can cause a solenoid to close and the motor to run in order to release the brakes.

As seen from the above, hydraulic pressure is needed to release these brakes. Thus, a problem arises when a vehicle of this nature breaks down. Since the engine oil pressure switch trips the relays to release pressure and turn off the motor to engage the brake, the pump will not run if the engine is not running. This is most problematic in a situation where the engine has broken down since the brakes will not release. Further adding to the dilemma, the vehicle cannot be towed because the brakes are locked up. This requires an operator to create pressure for the hydraulic system to release the brakes.

The prior art solutions to this problem are inconvenient and potentially hazardous. One such solution is to run jumper wires across relays on the pump kit, so that the pump will operate regardless of whether or not the engine is running. This requires that the operator leaves his seat and go to the pump kit, which is mounted either behind the seat, under the hood, or in the bed of the truck. The operator then has to determine which relays to bypass with jumper wires, and he may have to make jumper wires from raw wire.

If the operator can do this, the jumper wires bypass the relays, which causes the pump to run, which releases the brakes while he is out of the vehicle. This can result in the brakes being released while he is standing next to the vehicle, under the vehicle, or in the bed of the vehicle. In all cases, the brakes release while he is somewhere other than in his seat, buckled in, and in control. Obviously, the vehicle can roll while he does this operation, thereby creating a potential hazard. This is especially true in mining vehicles, which can operate on steep grades underground.

Moreover, many mines have volatile gases, which can be explosive when exposed to sparks. Running bypass wires across mechanical relays creates potential for sparking. The pumps also use petroleum-based fluids, which are flammable and should not be exposed to sparks.

Another hazard in the use of jumper wires is that bypassing relays can, in some cases, disable the emergency brake. Depending upon which relays are bypassed, the operator may or may not be able to engage the parking brakes in an emergency should the primary brakes fail while he is being towed. The operator would have to have a wiring diagram and the necessary technical expertise to understand the circuits to prevent disabling the brakes altogether.

An additional hazard could occur once the vehicle is repaired. Since the relays were bypassed by a jumper wire, someone has to remember to remove the jumper wire once the vehicle is fixed. If they fail to do so, they will be operating the vehicle without a proper parking and emergency brake and would lack awareness of this hazard.

Another prior art solution to releasing the brake is to use a hydraulic hand pump. Of course, this requires that the operator has a hand pump available to him. In this scenario, the operator must attach the hand pump to a brake line, pump up the pressure to release the brakes, and then lock it off for towing. Again, the driver is not in his seat and in control of the vehicle while he is doing this operation. Moreover, just as described above, someone has to remember to remove that hand pump once the vehicle is repaired, or the vehicle may be operated with no available parking and emergency brake.

Thus, a need exists in the art for a parking brake system having an improved mechanism for releasing the brake.

SUMMARY OF THE INVENTION

It is thus an object of one aspect of the present invention to provide a parking brake system which permits the brakes to be released in an emergency for towing without the need for special tools, supplies, or training.

It is an object of another aspect of the present invention to provide a system, as above, in which the operator may command the brakes to be released without having to leave his seat.

It is an object of an additional aspect of the present invention to provide a system, as above, which releases spring-applied, hydraulically-released parking brakes during normal operation by use of an electric motor operating a pump.

It is an object of yet another aspect of the present invention to provide a system, as above, which preserves the ability to engage the brakes when there is a loss of engine oil pressure, an open door, or manual engagement of a dash panel button.

These and other objects of the present invention, as well as the advantages thereof over existing prior-art forms, which will become apparent from the description to follow, are accomplished by the improvements hereinafter described and claimed.

In general, a brake system includes an engine oil pressure switch normally controlling the actuation of a brake. A controller can be selectively actuated to temporarily ignore a communication from the engine oil pressure switch to thereby release the brake.

In accordance with another aspect of the invention, a method of controlling a brake system including a brake normally controlled by an engine oil pressure switch includes the step of instructing the brake system to temporarily ignore a communication from the engine oil pressure switch to thereby release the brake.

A preferred braking system is shown by way of example in the accompanying drawing without attempting to show all the various forms and modifications in which the invention might be embodied, the invention being measured by the appended claims and not by the details of the specification.

BRIEF DESCRIPTION OF THE DRAWINGS

FIG. 1 is a schematic representation of a parking brake system of the present invention.

DETAILED DESCRIPTION OF A PREFERRED EMBODIMENT

A brake system according to the present invention which is particularly suited for a parking brake is generally indicated by the numeral 10 and includes a pump and motor assembly, generally indicated by the numeral 12, in electrical communication with a programmable logic controller (PLC) 14. Pump and motor assembly 12 includes a starter 13, a pump 15, an electric motor 16, a hydraulic fluid reservoir 17, and a dump valve 18, and is preferably of the type used in a small mining vehicle that does not have a hydraulic system.

Starter 13 can be any type of motor starter as would be known to those skilled in the art. Pump 15 can also be any type of pump as would be known to those skilled in the art such as generator pumps or swash plate piston pumps. Electric motor 16 likewise can be any electric motor as would be known to those skilled in the art. Similarly, dump valve 18 can be any type of dump valve as would be known to those skilled in the art. In the preferred embodiment, dump valve 18 is a solenoid dump valve.

Parking brake system 10 operates on a brake 19. Brake 19 can be any brake generally known to those skilled in the art and can be a single brake or a plurality of brakes. In the preferred embodiment, brake 19 is one or more spring-applied, hydraulically-released brakes.

PLC 14 is in electrical communication with an ignition switch 20, an oil pressure transducer 22, an engine oil pressure switch 24, a door switch 26, and a dash panel 28. This communication and the programming within PLC 14 allow the PLC 14 to affect or control the operation of parking brake system 10. Further, the use of PLC 14 allows parking brake system 10 to be devoid of electrical relays. A suitable example of PLC 14 is the model series HEC-200x-E-R, harsh environment controller, from Divelbiss Corporation in Fredericktown, Ohio.

PLC 14 is utilized to switch electric motor 16 and dump valve 18. To determine when to switch electric motor 16 and dump valve 18, PLC 14 monitors pressure by reading the signal from pressure transducer 22. If the pressure falls below a predetermined level while PLC 14 is maintaining brake 19 released, PLC 14 signals pump and motor assembly 12 to activate in order to generate more pressure. Thus, PLC 14 can itself turn motor 16 on and off rather than by use of simple switches and relays.

PLC 14 also monitors ignition switch 20, engine oil pressure switch 24, door switch 26, and dash panel 28. PLC 14 uses inputs from these components to determine whether or not motor 16 should be running and whether or not dump valve 18 should be open or closed. For example, if PLC 14 detects ignition switch 20 communicating that the engine is off, PLC 14 will engage brake 19. Similarly, under normal operation, if engine oil pressure switch 24 communicates to PLC 14 that the engine is off, PLC 14 will engage brake 19. PLC 14 will engage brake 19 if door switch 26 reports that a door is open or if an emergency stop button is activated.

Because parking brake system 10 uses PLC 14, it has more capabilities than a mechanical relay and can change the operation with certain inputs. One such additional capability is incorporating a "towing mode" into PLC 14 of parking brake system 10. As discussed above, in the normal operation of parking brake system 10 PLC 14 is communicating with brake 19 to engage when engine oil pressure switch 24 gives a signal to PLC 14 that the engine is off. The towing mode of PLC 14 is intended to bypass this normal operation. The towing mode can also be described as an additional mode; that is, a mode in addition to normal operation.

Such towing mode is preferably utilized to release brake 19 for towing by a towing vehicle when the engine of the vehicle containing brake 19 is not running or when a mechanical failure has occurred. The activation of a button, or other activation mechanism, communicates to PLC 14 to release brake 19, or to maintain brake 19 in a released state, even though engine oil pressure switch 24 is communicating that the engine is off. Upon activation, PLC 14 enters a "towing mode" and otherwise operates normally. When the activation mechanism is on dash panel 28, the operator can command PLC 14 to enter the towing mode without leaving the seat of the vehicle.

Thus, it can be said that the towing mode causes PLC 14 to temporarily ignore the communication from engine oil pressure switch 24 that the engine is off. However, the towing mode does not cause PLC 14 to entirely ignore engine oil pressure switch 24. When in the towing mode, if engine oil pressure switch 24 communicates to PLC 14 that the engine is back on, PLC 14 can exit the towing mode and resume normal operation.

When in the towing mode, the communication from engine oil pressure switch 24 that the engine is off is being ignored and brake 19 will release. In towing mode, PLC 14 continues to monitor the other switches and may still engage brake 19 when in towing mode. But, PLC 14 will ignore the condition of the engine not running.

Once the brakes are released, a light on dash panel 28 can be used to indicate that parking brake system 10 is in the towing mode. Brake 19 will release, but all other functions of parking brake system 10 are preserved, as discussed above. PLC 14 will still be capable of engaging brake 19 if the ignition key is turned off, if a door is opened, or if the operator hits an emergency stop button on the dash. The emergency stop button can be set up such that when the emergency stop button is engaged, the pressure is released completely and brake 19 engages.

When the vehicle is again able to operate and the engine starts, engine oil pressure switch 24 communicates to PLC 14 that the towing mode is no longer necessary. PLC 14 can then drop out of the towing mode and PLC 14 and parking brake system 10 can return to normal operation.

PLC 14 can also be designed to exit the towing mode by temporarily cutting the electricity to PLC 14. This effectually resets the system and, upon restoring electricity, PLC 14 resumes normal operation. PLC 14 can also be designed to exit the towing mode when an emergency stop button is activated.

PLC 14 utilizes an electrical input to operate. The electrical input can be from the vehicle, even if the vehicle is mechanically broken down, or from a secondary electrical source.

In operation of parking brake system 10, brake 19 is provided in hydraulic communication with pump 15. Pump 15 is in electric communication with PLC 14, which is in electric communication with oil pressure transducer 22 as described above. PLC 14 is provided with a towing mode that allows PLC 14 to ignore the communication from engine oil pressure switch 24 that the engine is off. The towing mode is most preferred when the associated vehicle does not have, or cannot utilize, a vehicle hydraulic system. Thus, the hydraulic communication to brake 19 is provided by pump and motor assembly 12, which can be separately provided to the vehicle.

The towing mode can then be entered by activating an activation mechanism. Upon entering the towing mode, PLC 14 begins ignoring the communication from engine oil pressure switch 24 that the engine is off, and brake 19 is released. Then, a vehicle having the parking brake system can be towed, while the towing mode is activated. When the towing mode is no longer desired, the system communicates to PLC 14 that the towing mode is no longer necessary and parking brake system 10 is returned to normal operation.

Such parking brake systems and associated methods of use accomplish the objects of the invention and otherwise substantially improve the art.

What is claimed is:

1. A brake system comprising an engine oil pressure switch normally controlling the actuation of a parking brake, and a controller selectively actuated to temporarily ignore a communication from said engine oil pressure switch to thereby release the parking brake.

2. The brake system of claim 1, wherein the parking brake is a spring-applied, hydraulically-released brake.

3. The brake system of claim 1, further comprising an activation mechanism for selectively actuating said controller.

4. The brake system of claim 3, said activation mechanism being positioned on a panel in vehicle containing the brake system.

5. The brake system of claim 3, said activation mechanism being capable of placing the brake system in an additional mode upon activation of said activation mechanism, where said additional mode allows the vehicle containing the brake system to be towed by a towing vehicle.

6. The brake system of claim 5, said brake system remaining capable of engaging the parking brake by one or more other mechanisms when said brake system is in the additional mode.

7. The brake system of claim 6, wherein said one or more other mechanisms are selected from the group consisting of an ignition key, an open door, an emergency stop button, and combinations thereof.

8. A method of controlling a brake system comprising the steps of providing a brake system having a parking brake normally controlled by an engine oil pressure switch and instructing the brake system to temporarily ignore a communication from the engine oil pressure switch to thereby release the parking brake.

9. The method of claim 8, wherein said step of instructing is performed by a programmable logic controller, and wherein said step of instructing maintains the brake system as capable of engaging the parking brake by one or more other mechanisms.

10. The method of claim 9, further comprising the step of activating an activation mechanism in communication with the programmable logic controller prior to said step of instructing.

11. The method of claim 10, wherein the step of activating includes placing the programmable logic controller in an additional mode which allows a vehicle containing the brake system to be towed by a towing vehicle.

12. The method of claim 11, further comprising the step of towing the vehicle containing the brake system while the programmable logic controller is in the additional mode.

13. The method of claim 11, further comprising the step of placing the programmable logic controller back in normal operation.

14. The method of claim 9, wherein the one or more other mechanisms are selected from the group consisting of an ignition key, an open door, an emergency stop button, and combinations thereof.

15. The method of claim 8, wherein the releasing of the parking brake is performed hydraulically.

16. The method of claim 15, further comprising the step of allowing the parking brake to re-engage, following the releasing of the parking brake.

\* \* \* \* \*